(12) United States Patent
Kurita et al.

(10) Patent No.: US 7,923,057 B2
(45) Date of Patent: Apr. 12, 2011

(54) METHODS AND APPARATUS FOR REDUCING IRREGULARITIES IN COLOR FILTERS

(75) Inventors: Shinichi Kurita, San Jose, CA (US); Bassam Shamoun, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 577 days.

(21) Appl. No.: 11/671,781

(22) Filed: Feb. 6, 2007

(65) Prior Publication Data

US 2007/0182775 A1   Aug. 9, 2007

Related U.S. Application Data

(60) Provisional application No. 60/771,284, filed on Feb. 7, 2006.

(51) Int. Cl.
 *B05D 5/06* (2006.01)
 *B05D 1/02* (2006.01)
(52) U.S. Cl. .................. 427/58; 427/66; 427/427.3
(58) Field of Classification Search .............. 427/58, 427/66, 427/427.3
 See application file for complete search history.

(56) References Cited

U.S. PATENT DOCUMENTS

| | | |
|---|---|---|
| 4,571,601 A | 2/1986 | Teshima |
| 4,987,043 A | 1/1991 | Roosen et al. |
| 5,114,760 A | 5/1992 | Takemura et al. |
| 5,177,627 A | 1/1993 | Ishiwata et al. |
| 5,232,634 A | 8/1993 | Sawada et al. |
| 5,232,781 A | 8/1993 | Takemura et al. |
| 5,264,952 A | 11/1993 | Fukutani et al. |
| 5,340,619 A | 8/1994 | Chen et al. |
| 5,399,450 A | 3/1995 | Matsushima et al. |
| 5,432,538 A | 7/1995 | Carlotta |
| 5,552,192 A | 9/1996 | Kashiwazaki et al. |
| 5,554,466 A | 9/1996 | Matsushima et al. |
| 5,593,757 A | 1/1997 | Kashiwazaki et al. |
| 5,626,994 A | 5/1997 | Takayanagi et al. |
| 5,648,198 A | 7/1997 | Shibata |
| 5,702,776 A | 12/1997 | Hayase et al. |
| 5,705,302 A | 1/1998 | Ohno et al. |
| 5,714,195 A | 2/1998 | Shiba et al. |
| 5,716,739 A | 2/1998 | Kashiwazaki et al. |
| 5,716,740 A | 2/1998 | Shiba et al. |
| 5,726,724 A | 3/1998 | Shirota et al. |
| 5,729,259 A | 3/1998 | Gotoh et al. |
| 5,748,266 A | 5/1998 | Kodate |

(Continued)

FOREIGN PATENT DOCUMENTS

CN       1160213 A      9/1997

(Continued)

OTHER PUBLICATIONS

10899/SK (Application No. 2007-12542) FOA dated Jan. 30, 2009.

(Continued)

*Primary Examiner* — Timothy H Meeks
*Assistant Examiner* — James Lin
(74) *Attorney, Agent, or Firm* — Dugan & Dugan, PC (57) ABSTRACT

Methods, apparatus and systems are disclosed for printing color filters for flat panel displays and avoiding mura effects by depositing a plurality of ink drops on a substrate within a column of pixel wells and intentionally varying the size and/or the relative lateral position of the ink drops deposited in the pixel wells. Numerous other aspects are disclosed.

32 Claims, 13 Drawing Sheets

Randomized Ink Drop
(+/−10μm Additional Landing Position Change)

U.S. PATENT DOCUMENTS

| | | | |
|---|---|---|---|
| 5,757,387 A | 5/1998 | Manduley | |
| 5,811,209 A | 9/1998 | Eida et al. | |
| 5,817,441 A | 10/1998 | Iwata et al. | |
| 5,831,704 A | 11/1998 | Yamada et al. | |
| 5,847,735 A | 12/1998 | Betschon | |
| 5,880,799 A | 3/1999 | Inoue et al. | |
| 5,895,692 A | 4/1999 | Shirasaki et al. | |
| 5,916,713 A | 6/1999 | Ochiai et al. | |
| 5,916,735 A | 6/1999 | Nakashima et al. | |
| 5,922,401 A | 7/1999 | Kashiwazaki et al. | |
| 5,948,576 A | 9/1999 | Shirota et al. | |
| 5,948,577 A | 9/1999 | Nakazawa et al. | |
| 5,956,063 A | 9/1999 | Yokoi et al. | |
| 5,962,581 A | 10/1999 | Hayase et al. | |
| 5,968,688 A | 10/1999 | Masuda et al. | |
| 5,969,780 A | 10/1999 | Matsumoto et al. | |
| 5,984,470 A | 11/1999 | Sakino et al. | |
| 5,989,757 A | 11/1999 | Satoi | |
| 6,013,415 A | 1/2000 | Sakurai et al. | |
| 6,025,898 A | 2/2000 | Kashiwazaki et al. | |
| 6,025,899 A | 2/2000 | Fukunaga et al. | |
| 6,042,974 A | 3/2000 | Iwata et al. | |
| 6,063,527 A | 5/2000 | Nishikawa et al. | |
| 6,066,357 A | 5/2000 | Tang et al. | |
| 6,071,989 A | 6/2000 | Sieber et al. | |
| 6,078,377 A | 6/2000 | Tomono et al. | |
| 6,087,196 A | 7/2000 | Sturm et al. | |
| 6,106,093 A | 8/2000 | Nagoshi | |
| 6,134,059 A | 10/2000 | Shirota et al. | |
| 6,140,988 A | 10/2000 | Yamada | |
| 6,142,604 A | 11/2000 | Kanda et al. | |
| 6,145,981 A | 11/2000 | Akahira et al. | |
| 6,149,257 A | 11/2000 | Yanaka et al. | |
| 6,153,711 A | 11/2000 | Towns et al. | |
| 6,154,227 A | 11/2000 | Lund | |
| 6,158,858 A | 12/2000 | Fujiike et al. | |
| 6,162,569 A | 12/2000 | Nakashima et al. | |
| 6,179,400 B1 | 1/2001 | Akahira et al. | |
| 6,196,663 B1 | 3/2001 | Wetchler et al. | |
| 6,211,347 B1 | 4/2001 | Sieber et al. | |
| 6,224,205 B1 | 5/2001 | Akahira et al. | |
| 6,226,067 B1 | 5/2001 | Nishiguchi et al. | |
| 6,228,435 B1 | 5/2001 | Yoshikawa et al. | |
| 6,234,626 B1 | 5/2001 | Axtell et al. | |
| 6,242,139 B1 | 6/2001 | Hedrick et al. | |
| 6,244,702 B1 | 6/2001 | Sakino et al. | |
| 6,264,322 B1 | 7/2001 | Axtell et al. | |
| 6,270,930 B1 | 8/2001 | Okabe | |
| 6,271,902 B1 | 8/2001 | Ogura et al. | |
| 6,277,529 B1 | 8/2001 | Marumoto et al. | |
| 6,281,960 B1 | 8/2001 | Kishimoto et al. | |
| 6,312,771 B1 | 11/2001 | Kashiwazaki et al. | |
| 6,322,936 B1 | 11/2001 | Nishikawa et al. | |
| 6,323,921 B1 | 11/2001 | Kurauchi et al. | |
| 6,331,384 B1 | 12/2001 | Satoi | |
| 6,341,840 B1 | 1/2002 | van Doorn et al. | |
| 6,344,301 B1 | 2/2002 | Akutsu et al. | |
| 6,356,357 B1 | 3/2002 | Anderson et al. | |
| 6,358,602 B1 | 3/2002 | Horiuchi et al. | |
| 6,367,908 B1 | 4/2002 | Serra et al. | |
| 6,384,528 B1 | 5/2002 | Friend et al. | |
| 6,384,529 B2 | 5/2002 | Tang et al. | |
| 6,386,675 B2 | 5/2002 | Wilson et al. | |
| 6,392,728 B2 | 5/2002 | Tanaka et al. | |
| 6,392,729 B1 | 5/2002 | Izumi et al. | |
| 6,394,578 B1 | 5/2002 | Akahira et al. | |
| 6,399,257 B1 | 6/2002 | Shirota et al. | |
| 6,417,908 B2 | 7/2002 | Nishiguchi et al. | |
| 6,424,393 B1 | 7/2002 | Hirata et al. | |
| 6,424,397 B1 | 7/2002 | Kuo | |
| 6,426,166 B2 | 7/2002 | Nishikawa et al. | |
| 6,428,135 B1 | 8/2002 | Lubinsky et al. | |
| 6,428,151 B1 | 8/2002 | Yi et al. | |
| 6,429,601 B1 | 8/2002 | Friend et al. | |
| 6,429,916 B1 | 8/2002 | Nakata et al. | |
| 6,433,852 B1 | 8/2002 | Sonoda et al. | |
| 6,450,635 B1 | 9/2002 | Okabe et al. | |
| 6,455,208 B1 | 9/2002 | Yamashiki et al. | |
| 6,462,798 B1 | 10/2002 | Kim et al. | |
| 6,464,329 B1 | 10/2002 | Koitabashi et al. | |
| 6,464,331 B1 | 10/2002 | Van Doorn et al. | |
| 6,468,702 B1 | 10/2002 | Yi et al. | |
| 6,471,352 B2 | 10/2002 | Akahira | |
| 6,475,271 B2 | 11/2002 | Lin | |
| 6,476,888 B2 | 11/2002 | Yamanashi | |
| 6,480,253 B1 | 11/2002 | Shigeta et al. | |
| 6,498,049 B1 | 12/2002 | Friend et al. | |
| 6,500,485 B1 | 12/2002 | Yamaguchi et al. | |
| 6,508,533 B2 | 1/2003 | Tsujimoto et al. | |
| 6,518,700 B1 | 2/2003 | Friend et al. | |
| 6,557,984 B2 | 5/2003 | Tanaka et al. | |
| 6,569,706 B2 | 5/2003 | Pakbaz et al. | |
| 6,580,212 B2 | 6/2003 | Friend | |
| 6,582,048 B1 | 6/2003 | Akahira et al. | |
| 6,627,364 B2 | 9/2003 | Kiguchi et al. | |
| 6,630,274 B1 | 10/2003 | Kiguchi et al. | |
| 6,667,795 B2 | 12/2003 | Shigemura | |
| 6,686,104 B1 | 2/2004 | Shiba et al. | |
| 6,692,983 B1 | 2/2004 | Chen et al. | |
| 6,693,611 B1 | 2/2004 | Burroughes | |
| 6,695,905 B2 | 2/2004 | Rozumek et al. | |
| 6,698,866 B2 | 3/2004 | Ward et al. | |
| 6,705,694 B1 | 3/2004 | Barbour et al. | |
| 6,738,113 B2 | 5/2004 | Yu et al. | |
| 6,762,234 B2 | 7/2004 | Grizzi | |
| 7,271,824 B2 | 9/2007 | Omori et al. | |
| 7,413,272 B2 | 8/2008 | Shamoun et al. | |
| 2001/0012596 A1 | 8/2001 | Kunimoto et al. | |
| 2001/0026307 A1* | 10/2001 | Akahira | 347/101 |
| 2002/0001025 A1* | 1/2002 | Galan et al. | 347/94 |
| 2002/0054197 A1 | 5/2002 | Okada et al. | |
| 2002/0081376 A1 | 6/2002 | Yonehara | |
| 2002/0109741 A1* | 8/2002 | Okabe et al. | 347/14 |
| 2002/0128515 A1 | 9/2002 | Ishida et al. | |
| 2003/0025446 A1 | 2/2003 | Lin et al. | |
| 2003/0030715 A1 | 2/2003 | Cheng et al. | |
| 2003/0039803 A1 | 2/2003 | Burroughes | |
| 2003/0076454 A1 | 4/2003 | Burroughes | |
| 2003/0117455 A1 | 6/2003 | Bruch et al. | |
| 2003/0118921 A1 | 6/2003 | Chen et al. | |
| 2003/0171059 A1 | 9/2003 | Kawase et al. | |
| 2003/0189604 A1 | 10/2003 | Bae et al. | |
| 2003/0218645 A1 | 11/2003 | Dings et al. | |
| 2003/0222927 A1 | 12/2003 | Koyama | |
| 2003/0224621 A1 | 12/2003 | Ostergard et al. | |
| 2004/0008243 A1 | 1/2004 | Sekiya | |
| 2004/0018305 A1 | 1/2004 | Pagano et al. | |
| 2004/0023567 A1 | 2/2004 | Koyama et al. | |
| 2004/0041155 A1 | 3/2004 | Grzzi et al. | |
| 2004/0075383 A1 | 4/2004 | Endo et al. | |
| 2004/0075789 A1 | 4/2004 | Wang | |
| 2004/0086631 A1 | 5/2004 | Han et al. | |
| 2004/0094768 A1 | 5/2004 | Yu et al. | |
| 2004/0097101 A1 | 5/2004 | Kwong et al. | |
| 2004/0097699 A1 | 5/2004 | Holmes et al. | |
| 2004/0104951 A1 | 6/2004 | Shibata et al. | |
| 2004/0109051 A1 | 6/2004 | Bright et al. | |
| 2004/0125181 A1 | 7/2004 | Nakamura | |
| 2004/0218002 A1 | 11/2004 | Nakamura | |
| 2005/0041073 A1 | 2/2005 | Fontaine et al. | |
| 2005/0057599 A1 | 3/2005 | Takenaka et al. | |
| 2005/0083364 A1 | 4/2005 | Billow | |
| 2006/0092204 A1 | 5/2006 | White et al. | |
| 2006/0092436 A1 | 5/2006 | White et al. | |
| 2006/0093751 A1* | 5/2006 | White et al. | 427/466 |
| 2006/0109290 A1 | 5/2006 | Shamoun | |
| 2006/0109296 A1 | 5/2006 | Shamoun et al. | |
| 2007/0042113 A1 | 2/2007 | Ji | |
| 2008/0024552 A1 | 1/2008 | White | |

FOREIGN PATENT DOCUMENTS

| | | |
|---|---|---|
| CN | 1162749 A | 10/1997 |
| DE | 1218473 | 6/1966 |
| EP | 0 675 385 A1 | 10/1995 |
| EP | 1 106 360 A1 | 6/2001 |
| JP | 59-075205 | 4/1984 |
| JP | 61-245106 | 10/1986 |

| | | |
|---|---|---|
| JP | 63-235901 | 9/1988 |
| JP | 63-294503 | 12/1988 |
| JP | 01-277802 | 11/1989 |
| JP | 02-173703 | 7/1990 |
| JP | 02-173704 | 7/1990 |
| JP | 06-340094 | 12/1994 |
| JP | 07-198924 | 8/1995 |
| JP | 08-160219 | 6/1996 |
| JP | 10-039130 | 2/1998 |
| JP | 10-073813 | 3/1998 |
| JP | 2001-183514 | 7/2001 |
| JP | 2002-148422 * | 5/2002 |
| JP | 2002-277622 | 9/2002 |
| JP | 2003-303544 | 10/2003 |
| JP | 2003-311965 | 11/2003 |
| JP | 2004-077681 | 3/2004 |
| JP | 2006-003574 | 1/2006 |
| KR | 2004-0020902 | 3/2004 |
| KR | 2004-0085787 | 10/2004 |
| TW | 523611 | 3/2003 |
| WO | WO 02/14076 A1 | 2/2002 |
| WO | WO 03/022590 | 3/2003 |
| WO | WO 03/045697 A1 | 6/2003 |

OTHER PUBLICATIONS

10899/CHI (Application No. 200710000439.4) OA dated Oct. 10, 2008.

Office Action of Korean Patent Application No. 10-2007-12542 (10899/SK) issued on May 28, 2008.

Office Action of U.S. Appl. No. 11/829,494 (11232) mailed Sep. 22, 2009.

Taiwan Search Report of Taiwan Patent Application No. 96104337 (10899/TW) Dated Sep. 18, 2009.

Taiwan Search Report of Taiwan Patent Application No. 96127655 (11232/TW) Dated Aug. 4, 2009.

Jan. 22, 2010 Response to Office Action of U.S. Appl. No. 11/829,494 (11232) mailed Sep. 22, 2009.

Notice of Abandonment of U.S. Appl. No. 11/829,494 (11232) mailed Dec. 28, 2010.

* cited by examiner

Standard Ink Drop with +/− 10% Volume Error

600

| Pixel | aR1 | aG1 | aB1 | aR2 | aG2 | aB2 |
|---|---|---|---|---|---|---|
| 1 | 96.0 | 100.0 | 90.0 | 110.0 | 90.0 | 104.0 |
| 2 | 96.0 | 100.0 | 90.0 | 110.0 | 90.0 | 104.0 |
| 3 | 96.0 | 100.0 | 90.0 | 110.0 | 90.0 | 104.0 |
| 4 | 96.0 | 100.0 | 90.0 | 110.0 | 90.0 | 104.0 |
| 5 | 96.0 | 100.0 | 90.0 | 110.0 | 90.0 | 104.0 |
| 6 | 96.0 | 100.0 | 90.0 | 110.0 | 90.0 | 104.0 |
| 7 | 96.0 | 100.0 | 90.0 | 110.0 | 90.0 | 104.0 |
| 8 | 96.0 | 100.0 | 90.0 | 110.0 | 90.0 | 104.0 |
| 9 | 96.0 | 100.0 | 90.0 | 110.0 | 90.0 | 104.0 |
| 10 | 96.0 | 100.0 | 90.0 | 110.0 | 90.0 | 104.0 |

602

| Pixel | 1 | 2 | 3 | 4 | aR1 | Pixel | 1 | 2 | 3 | 4 | aG1 | Pixel | 1 | 2 | 3 | 4 | aB1 |
|---|---|---|---|---|---|---|---|---|---|---|---|---|---|---|---|---|---|
| 1 | 24 | 24 | 24 | 24 | 96.0 | 1 | 25 | 25 | 25 | 25 | 100.0 | 1 | 22.5 | 22.5 | 22.5 | 22.5 | 90.0 |
| 2 | 24 | 24 | 24 | 24 | 96.0 | 2 | 25 | 25 | 25 | 25 | 100.0 | 2 | 22.5 | 22.5 | 22.5 | 22.5 | 90.0 |
| 3 | 24 | 24 | 24 | 24 | 96.0 | 3 | 25 | 25 | 25 | 25 | 100.0 | 3 | 22.5 | 22.5 | 22.5 | 22.5 | 90.0 |
| 4 | 24 | 24 | 24 | 24 | 96.0 | 4 | 25 | 25 | 25 | 25 | 100.0 | 4 | 22.5 | 22.5 | 22.5 | 22.5 | 90.0 |
| 5 | 24 | 24 | 24 | 24 | 96.0 | 5 | 25 | 25 | 25 | 25 | 100.0 | 5 | 22.5 | 22.5 | 22.5 | 22.5 | 90.0 |
| 6 | 24 | 24 | 24 | 24 | 96.0 | 6 | 25 | 25 | 25 | 25 | 100.0 | 6 | 22.5 | 22.5 | 22.5 | 22.5 | 90.0 |
| 7 | 24 | 24 | 24 | 24 | 96.0 | 7 | 25 | 25 | 25 | 25 | 100.0 | 7 | 22.5 | 22.5 | 22.5 | 22.5 | 90.0 |
| 8 | 24 | 24 | 24 | 24 | 96.0 | 8 | 25 | 25 | 25 | 25 | 100.0 | 8 | 22.5 | 22.5 | 22.5 | 22.5 | 90.0 |
| 9 | 24 | 24 | 24 | 24 | 96.0 | 9 | 25 | 25 | 25 | 25 | 100.0 | 9 | 22.5 | 22.5 | 22.5 | 22.5 | 90.0 |
| 10 | 24 | 24 | 24 | 24 | 96.0 | 10 | 25 | 25 | 25 | 25 | 100.0 | 10 | 22.5 | 22.5 | 22.5 | 22.5 | 90.0 |

Standard Ink Drop with +/- 10% Volume Error

604

| Pixel | 1 | 2 | 3 | 4 | Ar2 | Pixel | 1 | 2 | 3 | 4 | aG2 | Pixel | 1 | 2 | 3 | 4 | aB2 |
|---|---|---|---|---|---|---|---|---|---|---|---|---|---|---|---|---|---|
| 1 | 27.5 | 27.5 | 27.5 | 27.5 | 110.0 | 1 | 22.5 | 22.5 | 22.5 | 22.5 | 90.0 | 1 | 26 | 26 | 26 | 26 | 104.0 |
| 2 | 27.5 | 27.5 | 27.5 | 27.5 | 110.0 | 2 | 22.5 | 22.5 | 22.5 | 22.5 | 90.0 | 2 | 26 | 26 | 26 | 26 | 104.0 |
| 3 | 27.5 | 27.5 | 27.5 | 27.5 | 110.0 | 3 | 22.5 | 22.5 | 22.5 | 22.5 | 90.0 | 3 | 26 | 26 | 26 | 26 | 104.0 |
| 4 | 27.5 | 27.5 | 27.5 | 27.5 | 110.0 | 4 | 22.5 | 22.5 | 22.5 | 22.5 | 90.0 | 4 | 26 | 26 | 26 | 26 | 104.0 |
| 5 | 27.5 | 27.5 | 27.5 | 27.5 | 110.0 | 5 | 22.5 | 22.5 | 22.5 | 22.5 | 90.0 | 5 | 26 | 26 | 26 | 26 | 104.0 |
| 6 | 27.5 | 27.5 | 27.5 | 27.5 | 110.0 | 6 | 22.5 | 22.5 | 22.5 | 22.5 | 90.0 | 6 | 26 | 26 | 26 | 26 | 104.0 |
| 7 | 27.5 | 27.5 | 27.5 | 27.5 | 110.0 | 7 | 22.5 | 22.5 | 22.5 | 22.5 | 90.0 | 7 | 26 | 26 | 26 | 26 | 104.0 |
| 8 | 27.5 | 27.5 | 27.5 | 27.5 | 110.0 | 8 | 22.5 | 22.5 | 22.5 | 22.5 | 90.0 | 8 | 26 | 26 | 26 | 26 | 104.0 |
| 9 | 27.5 | 27.5 | 27.5 | 27.5 | 110.0 | 9 | 22.5 | 22.5 | 22.5 | 22.5 | 90.0 | 9 | 26 | 26 | 26 | 26 | 104.0 |
| 10 | 27.5 | 27.5 | 27.5 | 27.5 | 110.0 | 10 | 22.5 | 22.5 | 22.5 | 22.5 | 90.0 | 10 | 26 | 26 | 26 | 26 | 104.0 |

FIG. 6B

+/− 10% Randomized Ink Drop with +/− 10% Volume Error

Table 700:

| Pixel | bR1 | bG1 | bB1 | bR2 | bG2 | bB2 |
|---|---|---|---|---|---|---|
| 1 | 100.0 | 95.0 | 95.0 | 105.0 | 85.0 | 105.0 |
| 2 | 90.0 | 95.0 | 100.0 | 80.0 | 90.0 | 100.0 |
| 3 | 100.0 | 90.0 | 100.0 | 80.0 | 90.0 | 100.0 |
| 4 | 115.0 | 105.0 | 90.0 | 95.0 | 120.0 | 105.0 |
| 5 | 120.0 | 120.0 | 85.0 | 85.0 | 100.0 | 90.0 |
| 6 | 90.0 | 95.0 | 95.0 | 95.0 | 95.0 | 90.0 |
| 7 | 85.0 | 110.0 | 105.0 | 110.0 | 100.0 | 100.0 |
| 8 | 105.0 | 100.0 | 90.0 | 95.0 | 80.0 | 105.0 |
| 9 | 100.0 | 85.0 | 100.0 | 95.0 | 100.0 | 105.0 |
| 10 | 105.0 | 90.0 | 105.0 | 110.0 | 105.0 | 110.0 |

Table 702:

| Pixel | 1 | 2 | 3 | 4 | bR1 | 1 | 2 | 3 | 4 | bG1 | Pixel | 1 | 2 | 3 | 4 | bB1 |
|---|---|---|---|---|---|---|---|---|---|---|---|---|---|---|---|---|
| 1 | 30.0 | 20.0 | 30.0 | 20.0 | 100.0 | 20.0 | 30.0 | 20.0 | 25.0 | 95.0 | 1 | 20.0 | 20.0 | 25.0 | 30.0 | 95.0 |
| 2 | 20.0 | 20.0 | 20.0 | 30.0 | 90.0 | 20.0 | 25.0 | 20.0 | 30.0 | 95.0 | 2 | 30.0 | 20.0 | 20.0 | 30.0 | 100.0 |
| 3 | 25.0 | 25.0 | 20.0 | 30.0 | 100.0 | 25.0 | 20.0 | 25.0 | 20.0 | 90.0 | 3 | 20.0 | 25.0 | 25.0 | 30.0 | 100.0 |
| 4 | 30.0 | 30.0 | 25.0 | 30.0 | 115.0 | 30.0 | 25.0 | 30.0 | 20.0 | 105.0 | 4 | 25.0 | 20.0 | 20.0 | 25.0 | 90.0 |
| 5 | 30.0 | 30.0 | 30.0 | 30.0 | 120.0 | 30.0 | 30.0 | 30.0 | 30.0 | 120.0 | 5 | 20.0 | 20.0 | 25.0 | 20.0 | 85.0 |
| 6 | 20.0 | 30.0 | 20.0 | 20.0 | 90.0 | 30.0 | 20.0 | 25.0 | 20.0 | 95.0 | 6 | 20.0 | 20.0 | 25.0 | 30.0 | 95.0 |
| 7 | 20.0 | 25.0 | 20.0 | 20.0 | 85.0 | 30.0 | 30.0 | 25.0 | 25.0 | 110.0 | 7 | 30.0 | 20.0 | 25.0 | 30.0 | 105.0 |
| 8 | 25.0 | 25.0 | 30.0 | 25.0 | 105.0 | 20.0 | 30.0 | 25.0 | 25.0 | 100.0 | 8 | 20.0 | 20.0 | 20.0 | 30.0 | 90.0 |
| 9 | 25.0 | 25.0 | 30.0 | 20.0 | 100.0 | 20.0 | 20.0 | 25.0 | 20.0 | 85.0 | 9 | 30.0 | 30.0 | 20.0 | 20.0 | 100.0 |
| 10 | 30.0 | 25.0 | 25.0 | 20.0 | 105.0 | 25.0 | 25.0 | 20.0 | 20.0 | 90.0 | 10 | 25.0 | 25.0 | 25.0 | 30.0 | 105.0 |

| FIG. 7A |
|---|
| FIG. 7B |

FIG. 7A

+/−10% Randomized Ink Drop with +/− 10% Volume Error

704

| Pixel | 1 | 2 | 3 | 4 | bR2 |
|---|---|---|---|---|---|
| 1 | 20.0 | 25.0 | 30.0 | 30.0 | 105.0 |
| 2 | 20.0 | 20.0 | 20.0 | 20.0 | 80.0 |
| 3 | 20.0 | 20.0 | 20.0 | 20.0 | 80.0 |
| 4 | 30.0 | 20.0 | 25.0 | 20.0 | 95.0 |
| 5 | 20.0 | 25.0 | 20.0 | 20.0 | 85.0 |
| 6 | 20.0 | 20.0 | 25.0 | 30.0 | 95.0 |
| 7 | 20.0 | 30.0 | 30.0 | 30.0 | 110.0 |
| 8 | 25.0 | 20.0 | 30.0 | 20.0 | 95.0 |
| 9 | 20.0 | 30.0 | 25.0 | 20.0 | 95.0 |
| 10 | 30.0 | 30.0 | 30.0 | 20.0 | 110.0 |

| Pixel | 1 | 2 | 3 | 4 | bG2 |
|---|---|---|---|---|---|
| 1 | 20.0 | 20.0 | 20.0 | 25.0 | 85.0 |
| 2 | 30.0 | 20.0 | 20.0 | 20.0 | 90.0 |
| 3 | 20.0 | 20.0 | 30.0 | 20.0 | 90.0 |
| 4 | 30.0 | 30.0 | 30.0 | 30.0 | 120.0 |
| 5 | 25.0 | 20.0 | 25.0 | 30.0 | 100.0 |
| 6 | 30.0 | 20.0 | 25.0 | 20.0 | 95.0 |
| 7 | 30.0 | 30.0 | 20.0 | 20.0 | 100.0 |
| 8 | 20.0 | 20.0 | 20.0 | 20.0 | 80.0 |
| 9 | 30.0 | 20.0 | 30.0 | 20.0 | 100.0 |
| 10 | 25.0 | 20.0 | 30.0 | 30.0 | 105.0 |

| Pixel | 1 | 2 | 3 | 4 | bB2 |
|---|---|---|---|---|---|
| 1 | 20.0 | 25.0 | 30.0 | 30.0 | 105.0 |
| 2 | 30.0 | 30.0 | 20.0 | 20.0 | 100.0 |
| 3 | 25.0 | 20.0 | 30.0 | 25.0 | 100.0 |
| 4 | 30.0 | 25.0 | 20.0 | 30.0 | 105.0 |
| 5 | 20.0 | 20.0 | 20.0 | 30.0 | 90.0 |
| 6 | 25.0 | 20.0 | 25.0 | 20.0 | 90.0 |
| 7 | 20.0 | 30.0 | 25.0 | 25.0 | 100.0 |
| 8 | 20.0 | 30.0 | 25.0 | 30.0 | 105.0 |
| 9 | 20.0 | 30.0 | 30.0 | 25.0 | 105.0 |
| 10 | 20.0 | 30.0 | 30.0 | 30.0 | 110.0 |

METHODS AND APPARATUS FOR REDUCING IRREGULARITIES IN COLOR FILTERS

The present application claims priority to U.S. Provisional Patent Application Ser. No. 60/771,284, filed Feb. 7, 2006 and entitled "Methods And Apparatus For Reducing Irregularities In Color Filters" which is hereby incorporated herein by reference in its entirety for all purposes.

CROSS REFERENCE TO RELATED APPLICATIONS

The present application is related to the following commonly-assigned, co-pending U.S. Patent Applications, which are hereby incorporated herein by reference in their entirety for all purposes:

U.S. patent application Ser. No. 11/061,120, filed Feb. 18, 2005 and entitled "Methods And Apparatus For Precision Control Of Print Head Assemblies", and U.S. patent application Ser. No. 11/238,632, filed Sep. 29, 2005 and entitled "Methods And Apparatus For Inkjet Printing Color Filters For Displays".

FIELD OF THE INVENTION

The present invention relates generally to electronic device fabrication methods, and is more particularly concerned with the manufacture of color filters for flat panel displays.

BACKGROUND OF THE INVENTION

The flat panel display industry has been attempting to employ inkjet printing to manufacture display devices, in particular, color filters. One problem with effective employment of inkjet printing is that it is difficult to inkjet ink or other material accurately and precisely on a substrate while having high throughput. Accordingly, there is a need for improved methods and apparatus for efficiently printing using inkjet heads on a substrate.

SUMMARY OF THE INVENTION

In an aspect of the invention, a method is provided in which an ink drop is deposited on a substrate within a pixel well and the size of a subsequent ink drop deposited in the pixel well is intentionally varied. The varied size is chosen randomly to prevent an occurrence of a mura irregularity.

In another aspect of the invention, a method is provided in which an ink drop is deposited on a substrate within a pixel well and the relative position of a subsequent ink drop deposited in the pixel well is intentionally varied. The varied position is chosen randomly to prevent an occurrence of a mura irregularity.

In yet another aspect of the invention, a method is provided including depositing a plurality of ink drops on a substrate within a column of pixel wells; and intentionally varying a size of the ink drops deposited in the pixel wells.

In yet another aspect of the invention, an apparatus is provided including a print head adapted to deposit a plurality of ink drops on a substrate within a column of pixel wells; and a controller adapted to vary a size of the ink drops deposited in the pixel wells by the print head.

In yet another aspect of the invention, a method is provided including depositing a plurality of ink drops on a substrate within a column of pixel wells; and intentionally varying a relative lateral position of the ink drops deposited in the pixel wells.

In yet another aspect of the invention, an apparatus is provided including a print head adapted to deposit a plurality of ink drops on a substrate within a column of pixel wells; and a controller adapted to vary a relative lateral position of the ink drops deposited in the pixel wells by the print head.

Other features and aspects of the present invention will become more fully apparent from the following detailed description of exemplary embodiments, the appended claims and the accompanying drawings.

DETAILED DESCRIPTION

The present invention provides systems and methods for eliminating an error condition that may occur in the manufacture of color filters for flat panel displays. The error condition results from a phenomena that may occur when an inkjet printer is used to precisely deposit ink, or other materials, onto a substrate to form a color filter. Due to mechanical and electrical accuracy limitations, the volume and positioning of ink drops jetted onto a substrate may be uniformly off from the ideal target size and/or location such that even though the printer depositing the ink is operating within tolerances, the cumulative effect of repeating the same small error for each drop becomes a visible irregularity to a naked human eye viewing a flat panel display with a color filter manufactured using an inkjet printer. In other words, even if ink drops are consistently deposited within tolerances such that only imperceptible variations from the ideal occur for each and every individual drop, a series of drops that are uniformly so disposed may collectively create a perceptible irregularity. This error may be referred to as a mura irregularity or effect. Mura is a transliterated term from Japanese and has no apparent English equivalent.

The present invention provides methods and apparatus for printing color filters without creating mura irregularities in flat panel displays. In accordance with the present invention, the amount of variation that occurs in depositing ink drops on a substrate is intentionally increased (e.g., from the minimum amount of variation defined by the maximum accuracy capability of the printer) so that discernible, repeating uniformity in drop position and/or size is avoided in adjacent pixels or sets of pixels.

Figure 1:
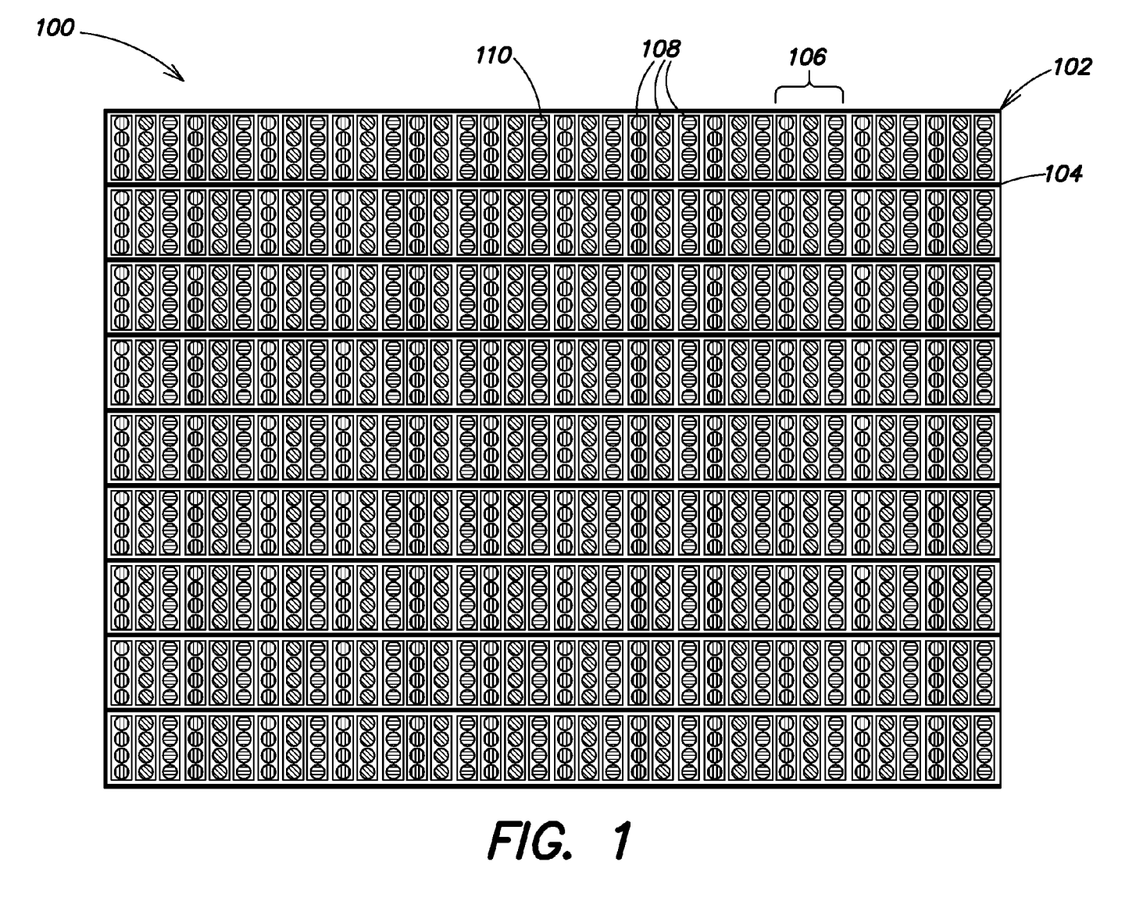
FIG. 1 is a magnified representation of an example of an ideal color filter.

Turning to FIG. 1, a magnified representation of an example of an ideal color filter 100 is depicted. The color filter 100 includes a substrate 102 with an array of pixels defined by black matrix material 104. Each pixel 106 includes three different color (e.g., red, green, blue) sub-pixel wells 108 that are each filled with a series of ink drops 110. In the example shown, four drops of ink 110 have been deposited in a column in each sub-pixel well 108. During manufacture, the substrate 102 was moved on a stage, driven by an X-Y table, below a print head (not shown) disposed above the substrate 102. The print head deposited four drops of ink in each sub-pixel well 108.

The color filter 100 depicted in FIG. 1 is a representation of a plan view of an ideal color filter wherein each sub-pixel 108 includes drops 110 of an identical size that have been deposited in a column exactly in the center of each of the sub-pixel wells 108. Ideal sizing and placement of ink drops can be difficult to achieve. Various factors including electrical crosstalk between the signals used to trigger individual print head nozzles to jet ink can cause drop size variations. Among other things, mechanical error in the alignment of print head nozzles as well as the X-Y table (stage) may contribute to positioning error. While these types of errors may be corrected to a large extent, it may be difficult and/or cost prohibitive, for example, to adjust a fire pulse voltage signal for each nozzle (which controls drop size) to have less than a threshold percentage error tolerance or to improve the drop landing accuracy to less than +/− a threshold distance. As an example, the current generation of inkjet printers manufactured by Applied Materials is able to control fire pulse voltage to within a 1% tolerance which may result in a +/−10% volume error and drop landing accuracy to within +/−5 um. While these accuracy thresholds or tolerances consistently land properly sized drops within target pixel wells, these tolerances may not be sufficient to avoid creating a mura irregularity.

Figure 2:
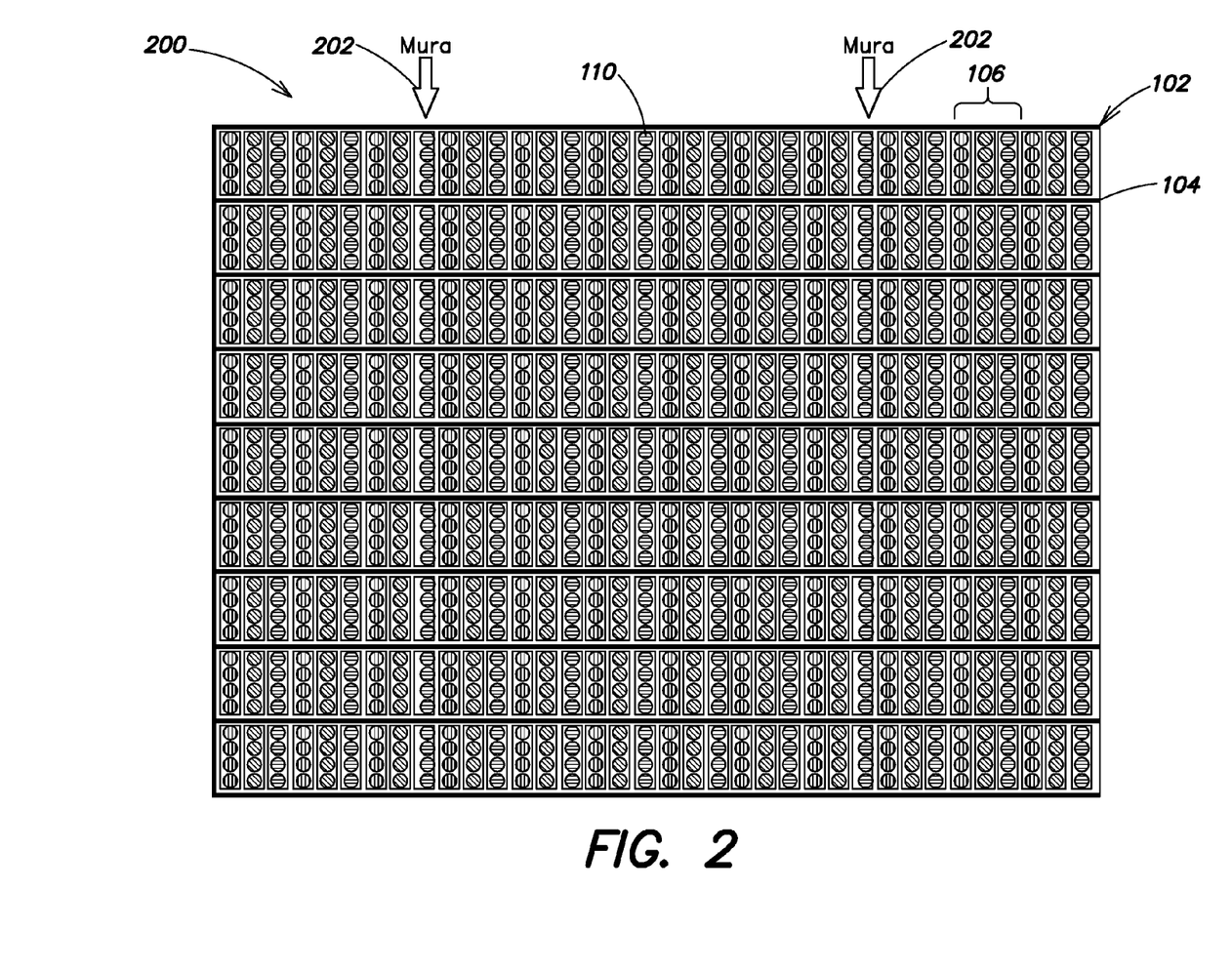
FIG. 2 is a magnified representation of an example of a plan view of color filter with arrows indicating mura irregularities.
Figure 3:
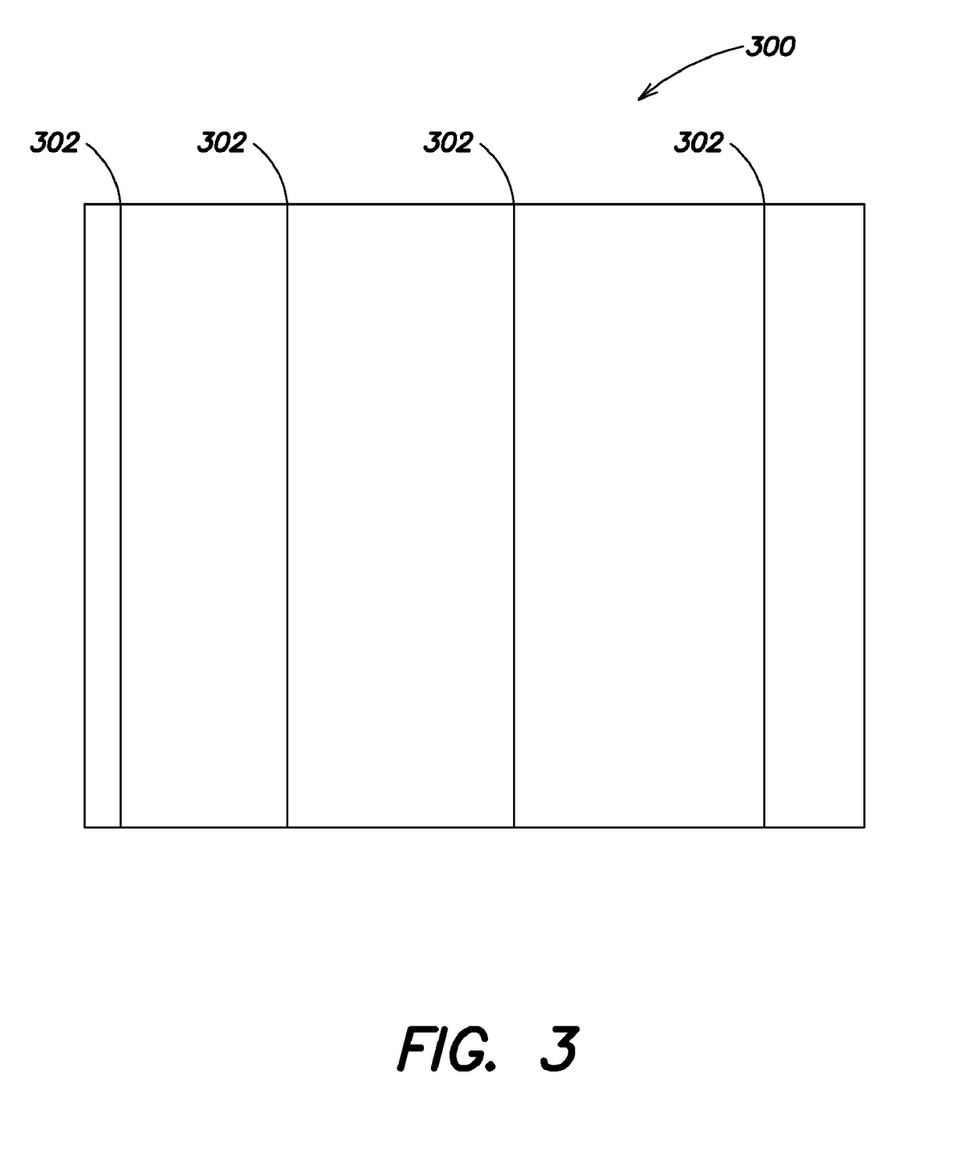
FIG. 3 is an example representation of the output of a flat panel display exhibiting mura irregularities.

Turning to FIG. 2, a magnified representation of an example of a plan view of color filter 200 with arrows indicating mura irregularities 202 is depicted. Note that the drops 100 are all positioned and sized to fit within their respective pixel wells 106, in other words, within tolerances. Despite being within tolerance, mura irregularities may occur, for example, where several drops within a column of sub-pixel wells are displaced slightly off center within their respective sub-pixel wells. FIG. 3 depicts an example representation of the output of a flat panel display 300 exhibiting mura irregularities 302 while displaying a field of solid white. Note that lines are visible where the mura irregularities exist.

Figure 4:
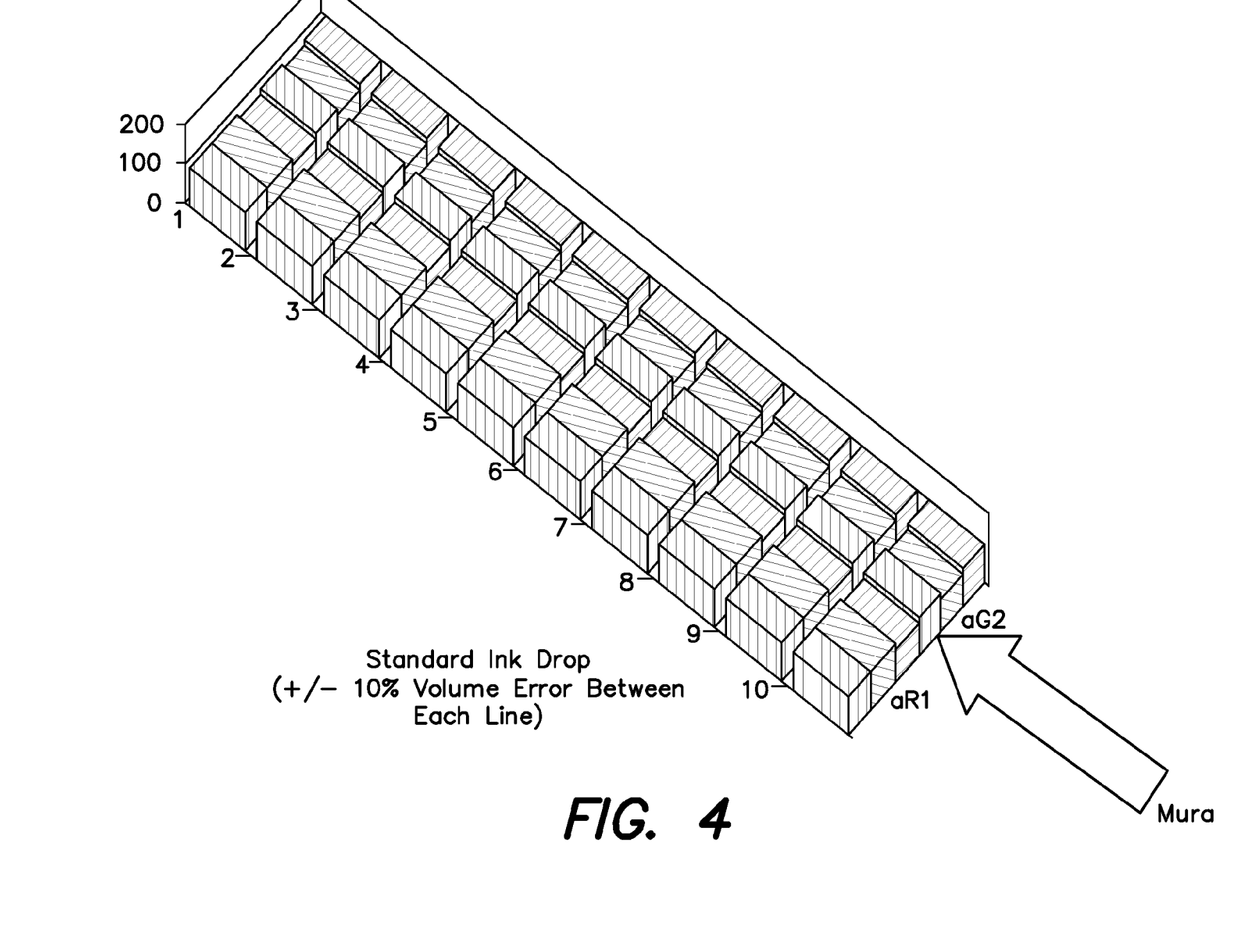
FIG. 4 is a perspective view representation of two columns of pixels with a mura irregularity.

FIG. 4 is a perspective view representation of two columns of pixels, each with three sub-pixels. The height of each sub-pixel represents a total amount of ink that was deposited within the sub-pixel. Note that where the arrow indicates a mura irregularity, the adjacent columns of sub-pixels consistently have a relatively large variation in the amount of ink between the two columns. The effect results from a consistently reduced and/or increased amount of ink being deposited in a column next to a column with a nominal amount of ink. The problem can be aggravated by having a reduced ink column adjacent an increased ink column. Thus, either the consistently offset ink drops depicted in the example of FIG. 2 or the consistently reduced (or increased) ink quantities depicted in FIG. 4 may result in the visible mura effect shown in FIG. 3. Further, the combination of consistently offset drops and consistently reduced or increased amount of ink may create a cumulative visible mura irregularity even where only one of these situations might not have resulted in a visible mura effect.

Figure 5:
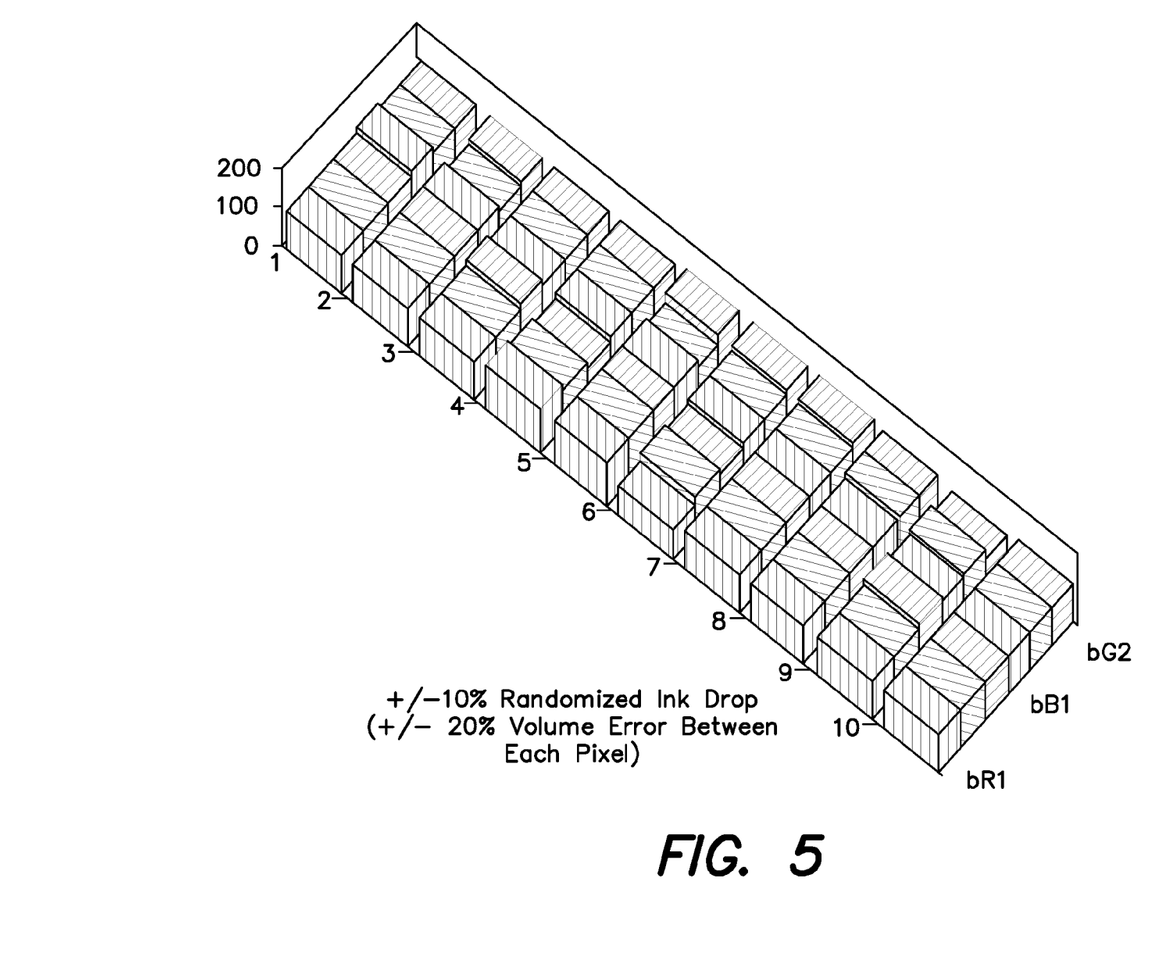
FIG. 5 is a perspective view representation of two columns of pixels without a mura irregularity.

Counter intuitively, the present invention solves the problem of mura irregularities by increasing the nominal error tolerances of the inkjet printer. In other words, instead of attempting to reduce error tolerances below whatever thresholds at which the printer was designed to operate, the present invention varies the target drop size and/or drop position to prevent the repetition of the same small error in a series of drops that would otherwise become visible as a mura irregularity. FIG. 5 is a perspective view representation of two columns of pixels, each with three sub-pixels. As with FIG. 4, the height of each sub-pixel represents a total amount of ink that was deposited within the respective sub-pixel. Note that there is an increased amount of variation of ink quantity between different sub-pixels and thus, there is no consistent series of reduced (or increased) amounts of ink in any of the columns. This variation of drop size may therefore be used to avoid creating visible mura effects related to drop size and/or drop position.

FIGS. 6A, 6B, 7A and 7B are tables that show the actual values used to create the examples in FIGS. 4 and 5, respectively. The summary tables 600, 700 include the total quantity of ink values plotted in FIGS. 4 and 5, respectively. These values were calculated using the example randomly generated drop size data shown in the source tables 602, 604, 702, 704. In this example, each pixel (sub-pixel) is filled with four drops represented by the drop sizes listed under the "1", "2", "3", and "4" headings in the tables 602, 604, 702, 704. The value listed under the pixel identification heading (e.g., aR1, aG1, aB1, etc.) is the sum of the four drop sizes (e.g., the total quantity) deposited into the respective sub-pixel. The total quantity values are feed into their respective position in the summary tables 600, 700.

Figure 6A:
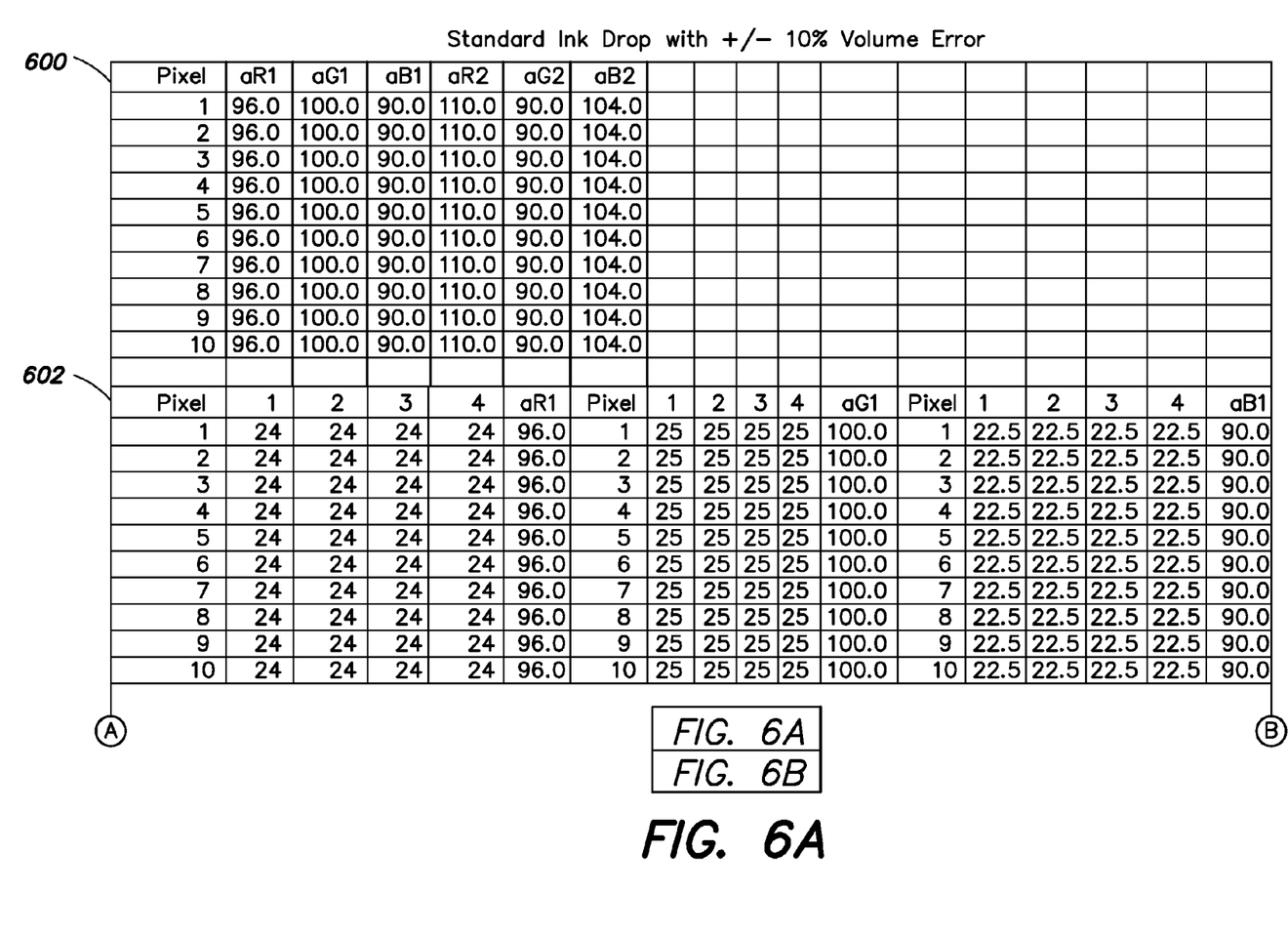
FIGS. 6A, 6B, 7A and 7B include tables that depict the actual values used to create the examples in FIGS. 4 and 5, respectively.
Figure 6B:
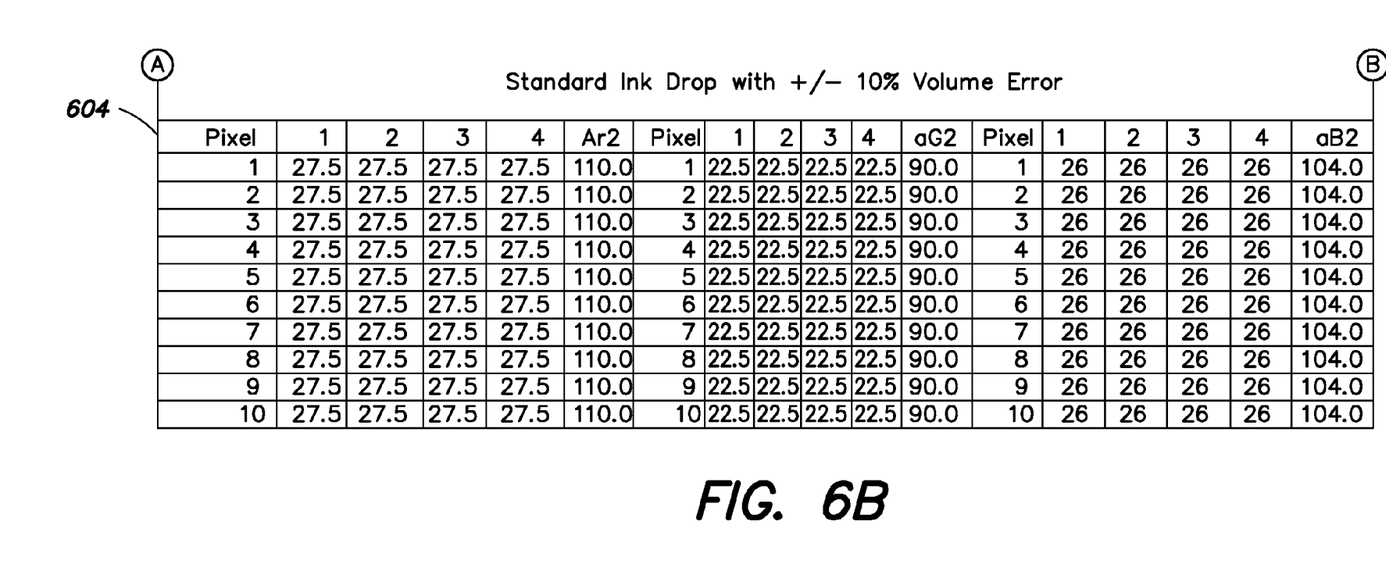

When generated, the example random drop size data in FIGS. 6A and 6B was constrained to be within +/−10 percent of the ideal/target value. Thus, with a target value of 25 pl, the individual drop sizes can range from 22.5 pl to 27.5 pl but they are consistent within a given column of sub-pixels. This consistency is because the same print head nozzle is used for depositing ink into a given column of sub-pixels and the error remains the same from same size drop to drop. In contrast, example randomly generated drop size data in FIGS. 7A and 7B was varied by +/−10 percent for a given column of sub-pixels (e.g., for a given print head nozzle) with a +/−10 percent volume error. This results in a total nominal error of +/−20 percent such that individual drops can range from 20 pl to 30 pl but they vary within a given column of sub-pixels. Note that, unlike in the case of repeating that same drop size, at different drop sizes the amount of error may vary from differently sized drop to drop. Further note that these values and ranges are merely provided as examples and that many different values and ranges could be used. Various methods of varying drop size and position are described in detail in the documents previously incorporated by reference listed above.

Figure 7A:
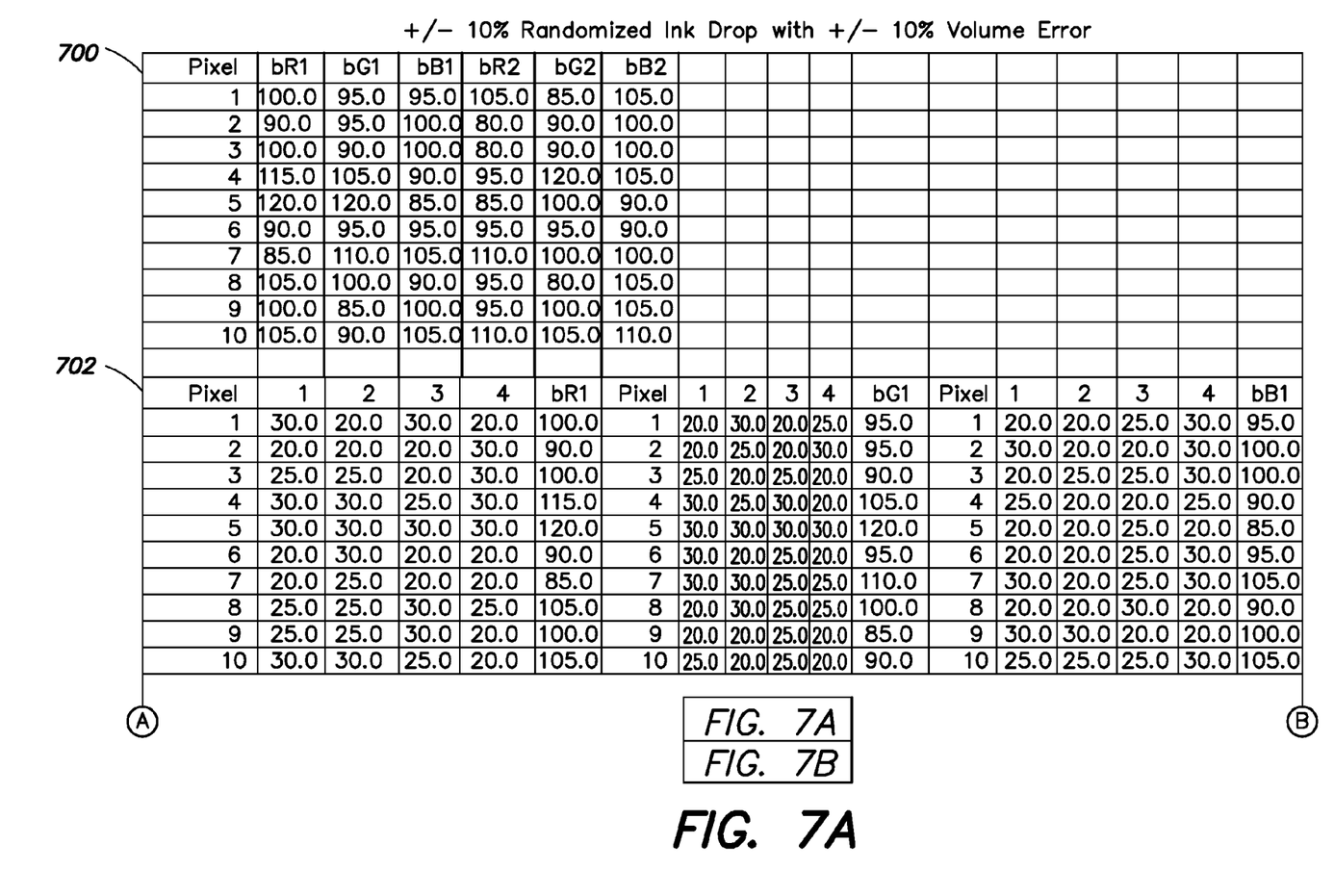
Figure 7B:
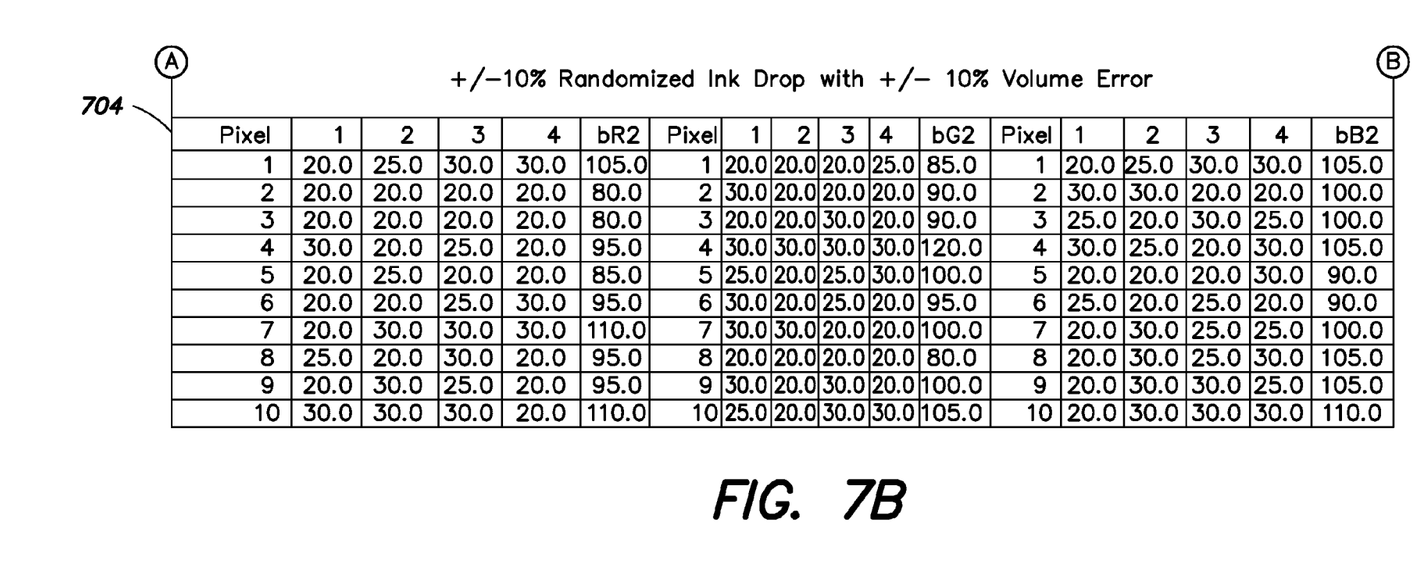

As can be seen from the summary table 700 in FIG. 7A compared to the summary table 600 of FIG. 6A, by increasing the nominal error, the amount of variation in drop size is increased. As shown in the plots of the summary tables 600, 700, in FIGS. 4 and 5, this variation may be used to avoid creating visible mura effects.

Figure 8:
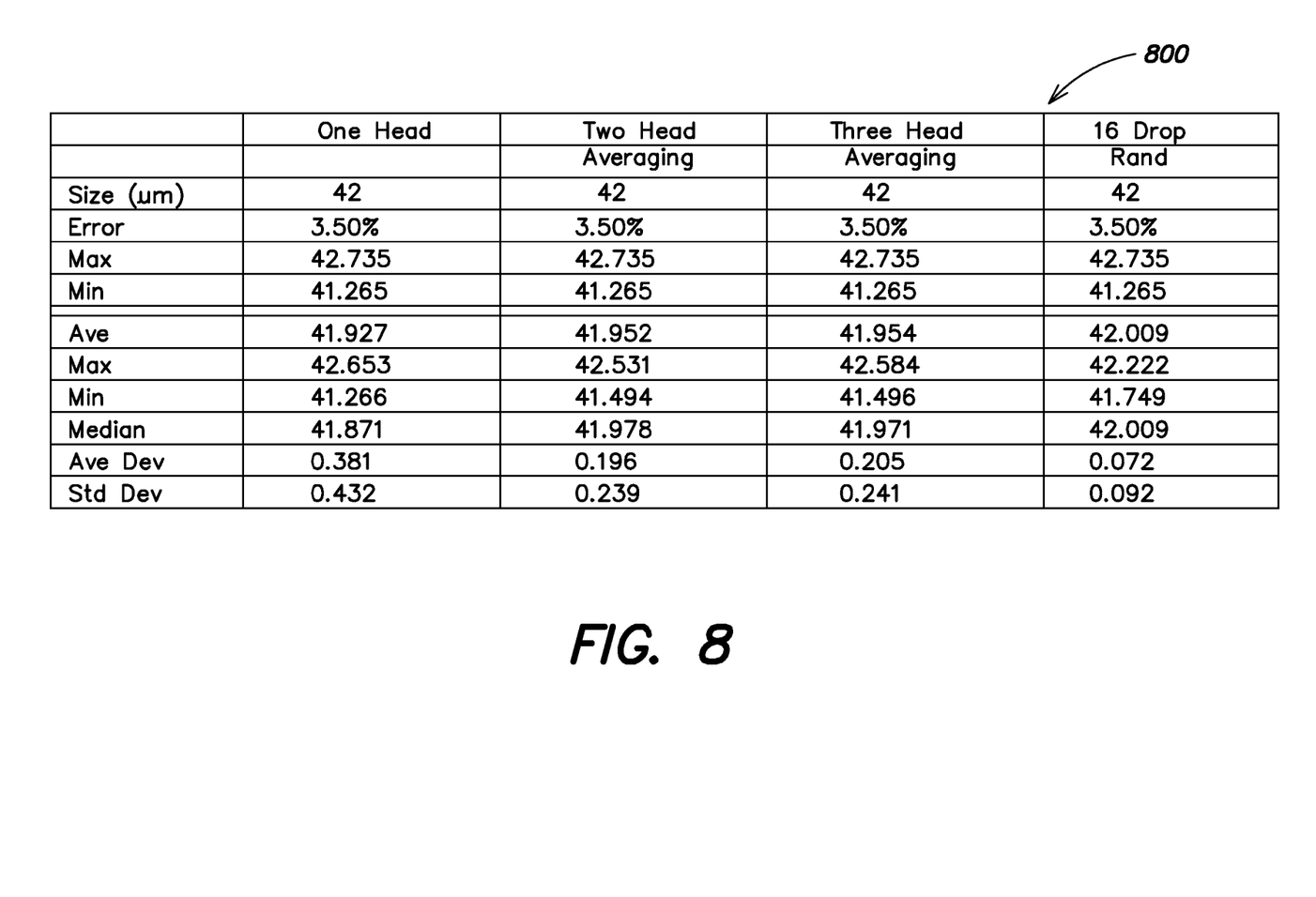
FIG. 8 is a table that illustrates that the standard deviation of ink volume per pixel is reduced by introducing a variation to drop size according to the present invention.
Figure 9:
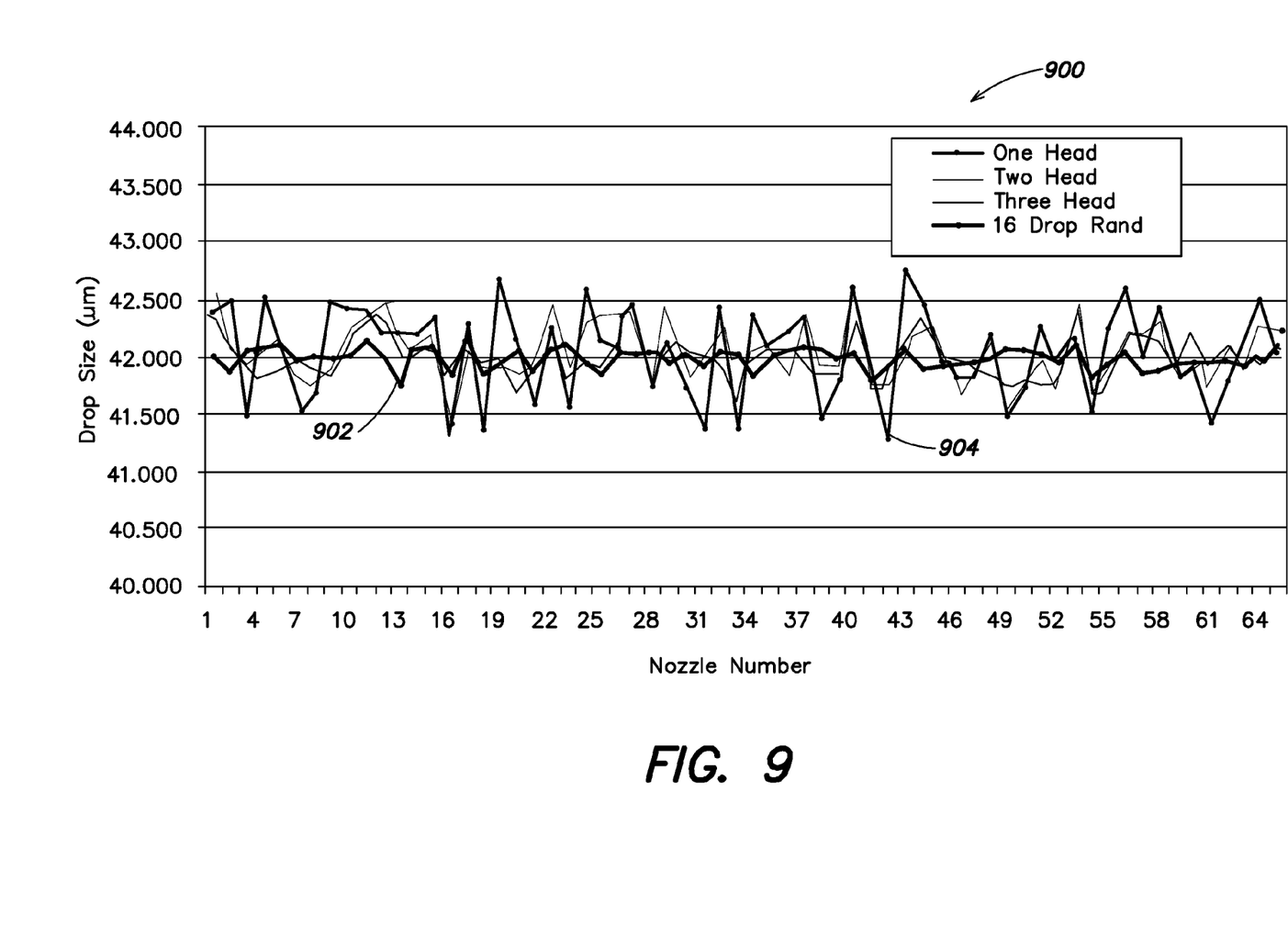
FIG. 9 is a graph that illustrates that the standard deviation of ink volume per pixel is reduced by introducing a variation to drop size according to the present invention.

Turning to FIGS. 8 and 9, a table and graph are provided respectively that illustrate that the standard deviation of ink volume per pixel is reduced by introducing a variation to drop size according to the present invention. In the example depicted in the table 800 of FIG. 8, the nominal drop size is 42 um in diameter. The error is 3.5% and thus, the range of drop sizes can vary from 41.265 um to 42.735 um. The table 800 shows that a nozzle of one print head will on average deposit 41.927 um drops (in, for example, a 16 drop sub-pixel) with a standard deviation of 0.432 from column to column (e.g., print pass to print pass). However, by intentionally varying the drop size of the sixteen drops that are to be deposited in each pixel, the average drop size is 42.009 with a standard deviation of 0.092 which is less than one quarter of the one print head result. This result is graphically depicted in FIG. 9 by comparison of the substantially flatter line plot 902 (which represents the intentionally varied drop size across the nozzles) versus the relatively spiky line plot 904 (which represents the drop sizes of one print head).

Figure 10:
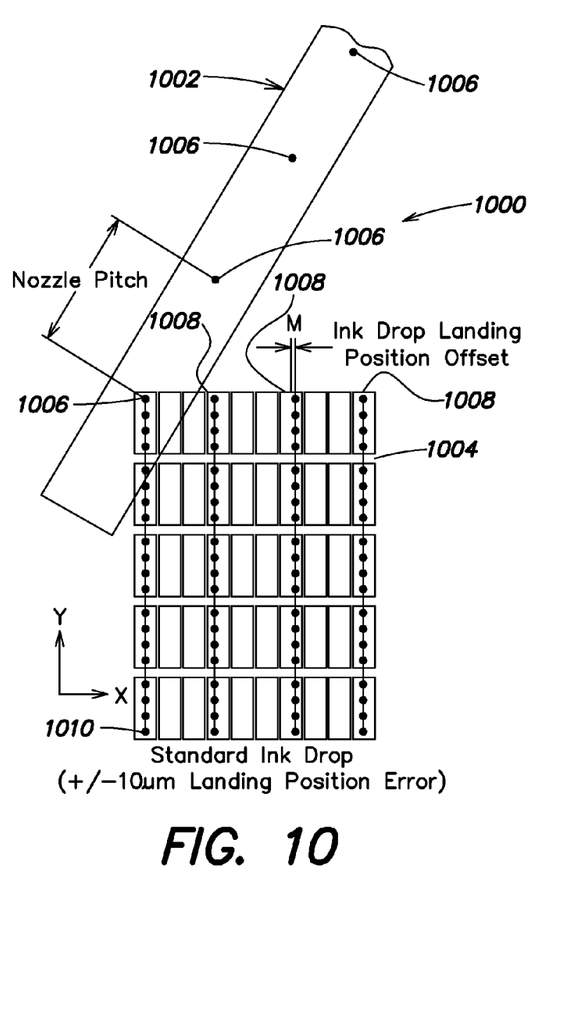
FIG. 10 is a representation of magnified color filter being manufactured.
Figure 11:
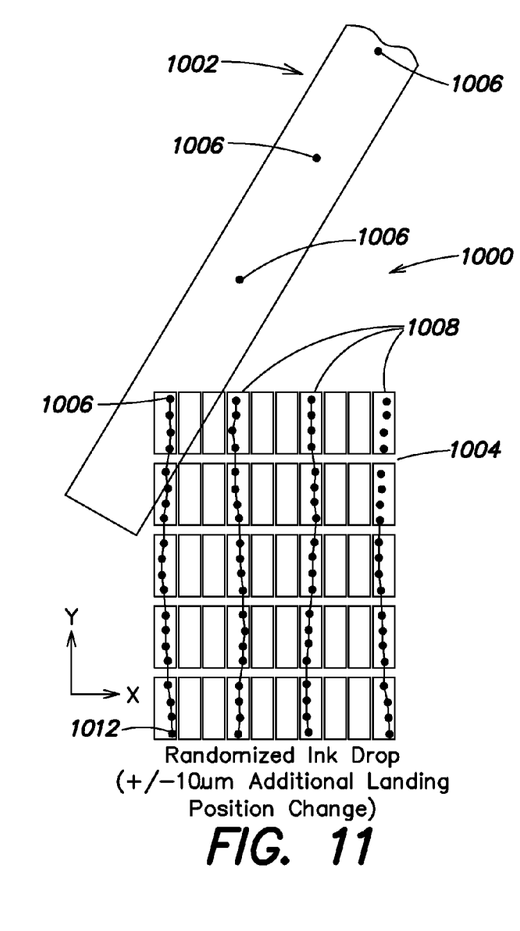
FIG. 11 is a representation of magnified color filter being manufactured according to methods of the present invention.

Turning to FIGS. 10 and 11, an additional or alternative method of avoiding mura effects is depicted. Representations of magnified color filters 1000 are shown being manufactured. Print heads 1002 are shown positioned above the substrates 1004 such that the nozzles 1006 of the print heads 1002 are aligned to deposit ink into the sub-pixel wells 1008 of the color filters 1000 when the substrates 1004 are moved under the print heads 1002 in the Y-direction indicated by the Y-axis reference. Within each target sub-pixel well 1008, a series of drop landing positions 1010, 1012 are indicated by interconnected dots.

The color filter 1000 of FIG. 10 is being manufactured using a conventional method of depositing ink as close to the center of the pixel wells 1008 as possible given the accuracy of the printer. However, as shown by the ink drop landing position offset M, some error (e.g., +/−10 μm, an amount within tolerances) in some columns of sub-pixel wells 1008 can be expected such that a visible mura effect may result.

In contrast, the color filter 1000 of FIG. 11 is shown being manufactured according to embodiments of the present invention. Instead of attempting to deposit ink in a straight column in the absolute lateral center of each of the sub-pixels, the ink drops are targeted to be deposited at varying lateral positions (e.g., +/−10 μm in addition to the inherent +/−10 μm of error) within the pixel wells 1008 as shown by the drop landing positions 1012 in FIG. 11.

In some embodiments, as with drop size, the drop landing positions may be varied randomly or they may be varied based upon a function, such as for example, a sine curve as depicted in FIG. 11. Varying the drop landing positions 1012 may be achieved by varying the print head position during printing and/or by shifting the substrate's position laterally (e.g., perpendicular to the printing direction) during printing. In some embodiments, the print head 1002 may be moved as a function of the stage (the table supporting the substrate) or the substrate position, or as a function of time. For example, as the substrate is moved by the stage in the print direction, the print head may be continuously shifted laterally depending on the stage position or based some predetermined frequency, constant or variable. For example, the print head 1002 may be continuously moved in the X-direction +/−5 to 20 μm from the nominal target position while the filter 1000 is being printed (in the Y-direction). A random number generator coupled to the print head positioning mechanism may be used to continuously select the amounts of +/−X-direction movement variation within the predefined range. In some embodiments, the position of the print head 1002 may be changed with every drop (e.g., 20 KHz), with groups of drops (e.g., ~800 Hz to 20 KHz), with each pixel (e.g., ~500 to ~800 Hz), and/or with groups of pixels (e.g., every 5 to 10 pixels, 50 to 60 Hz). Various methods of varying drop size and position using an inkjet printer are described in detail in the documents previously incorporated by reference listed above. In some embodiments a servo motor or piezoelectric actuator may be employed to accurately generate the position variations of the print head and/or substrate/stage during printing. In other embodiments, the print head 1002 may be vibrated at a high frequency and/or variable frequency to relatively randomly generate the position variations.

Figure 12:
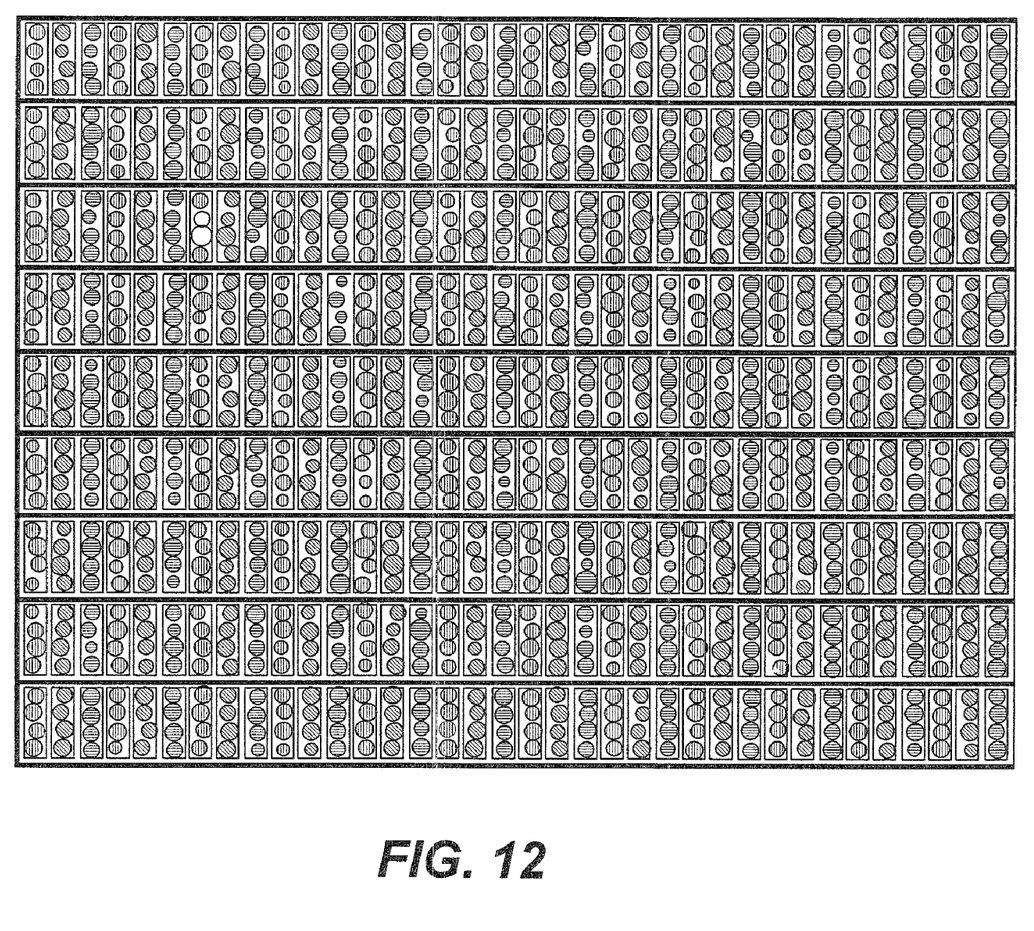
FIG. 12 is a magnified representation of an example of a color filter manufactured according to methods of the present invention.

As depicted in FIG. 12, in some embodiments, both drop size variation and position variation methods of the present invention may be concurrently employed. Combinations of the two methods may be used to find an optimal amount of drop size and/or drop position variation to minimize the likelihood of creating a mura effect.

The foregoing description discloses only particular embodiments of the invention; modifications of the above disclosed methods and apparatus which fall within the scope of the invention will be readily apparent to those of ordinary skill in the art. For instance, it will be understood that the invention also may be employed with any type of ink or color filter material to make any type or size color filter. Accordingly, while the present invention has been disclosed in connection with specific embodiments thereof, it should be understood that other embodiments may fall within the spirit and scope of the invention, as defined by the following claims.

The invention claimed is:

1. A method comprising:
   depositing a plurality of ink drops on a substrate within a column of pixel wells; and
   intentionally varying a size of the ink drops ejected from a given nozzle and deposited in the pixel wells,
   wherein the size of the ink drops is varied randomly to prevent an occurrence of a mura irregularity.

2. The method of claim 1 wherein the size of the ink drops is varied based on a function of a position of the substrate.

3. The method of claim 1 wherein the size of the ink drops is varied based on a function of time.

4. The method of claim 1 further including intentionally varying a relative lateral position of the ink drops deposited in the pixel wells.

5. The method of claim 4 wherein intentionally varying a relative lateral position of the ink drops includes varying a lateral position of a print head during printing.

6. The method of claim 1 wherein the size of the ink drops is varied between each ink drop.

7. The method of claim 1 wherein the size of the ink drops is varied between groups of ink drops.

8. The method of claim 1 wherein the size of the ink drops is varied between pixel wells.

9. A method comprising:
   depositing a plurality of ink drops on a substrate within a column of pixel wells; and
   intentionally varying a relative lateral position of the ink drops deposited in the pixel wells,
   wherein the relative lateral position of the ink drops is varied randomly to prevent an occurrence of a mura irregularity.

10. The method of claim 9 wherein the relative lateral position of the ink drops is varied based on a function of a position of the substrate.

11. The method of claim 9 wherein the relative lateral position of the ink drops is varied based on a function of time.

12. The method of claim 9 further including intentionally varying a size of the ink drops deposited in the pixel wells.

13. The method of claim 12 wherein intentionally varying a size of the ink drops includes varying a volume of ink jetted by a print head during printing.

14. The method of claim 9 wherein the relative lateral position of the ink drops is varied between each ink drop.

15. The method of claim 9 wherein the relative lateral position of the ink drops is varied between groups of ink drops.

16. The method of claim 9 wherein the relative lateral position of the ink drops is varied between pixel wells.

17. A method comprising:
depositing a plurality of ink drops on a substrate within a column of pixel wells; and
intentionally varying a size of the ink drops ejected from a given nozzle and deposited in the pixel wells,
wherein a nominal tolerance of the size of the ink drops is increased to prevent an occurrence of a mura irregularity.

18. The method of claim 17 wherein the size of the ink drops is varied based on a function of a position of the substrate.

19. The method of claim 17 wherein the size of the ink drops is varied based on a function of time.

20. The method of claim 17 further including intentionally varying a relative lateral position of the ink drops deposited in the pixel wells.

21. The method of claim 20 wherein intentionally varying a relative lateral position of the ink drops includes varying a lateral position of a print head during printing.

22. The method of claim 17 wherein the size of the ink drops is varied between each ink drop.

23. The method of claim 17 wherein the size of the ink drops is varied between groups of ink drops.

24. The method of claim 17 wherein the size of the ink drops is varied between pixel wells.

25. A method comprising:
depositing a plurality of ink drops on a substrate within a column of pixel wells; and
intentionally varying a relative lateral position of the ink drops deposited in the pixel wells,
wherein a nominal tolerance of the relative lateral position of the ink drops is increased to prevent an occurrence of a mura irregularity.

26. The method of claim 25 wherein the relative lateral position of the ink drops is varied based on a function of a position of the substrate.

27. The method of claim 25 wherein the relative lateral position of the ink drops is varied based on a function of time.

28. The method of claim 25 further including intentionally varying a size of the ink drops deposited in the pixel wells.

29. The method of claim 28 wherein intentionally varying a size of the ink drops includes varying a volume of ink jetted by a print head during printing.

30. The method of claim 25 wherein the relative lateral position of the ink drops is varied between each ink drop.

31. The method of claim 25 wherein the relative lateral position of the ink drops is varied between groups of ink drops.

32. The method of claim 25 wherein the relative lateral position of the ink drops is varied between pixel wells.

* * * * *